United States Patent
Matsukuma

(10) Patent No.: US 6,303,392 B1
(45) Date of Patent: *Oct. 16, 2001

(54) ETCHING MASK, METHOD OF MAKING SAME, ETCHING METHOD, MAGNETIC HEAD DEVICE AND METHOD OF MANUFACTURING SAME

(75) Inventor: Koji Matsukuma, Akashi (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/219,707

(22) Filed: Dec. 23, 1998

(30) Foreign Application Priority Data

Dec. 25, 1997 (JP) .................................................. 9-357844
Nov. 13, 1998 (JP) ................................................ 10-323885

(51) Int. Cl.⁷ ...................................................... H01L 21/00
(52) U.S. Cl. .............................. 438/3; 438/689; 438/942; 438/975
(58) Field of Search ................................ 438/3, 689, 942, 438/970, 975

(56) References Cited

U.S. PATENT DOCUMENTS 5,452,164 * 9/1995 Cole et al. .

FOREIGN PATENT DOCUMENTS

A-3-252907   11/1991 (JP) .
A-7-225917    8/1995 (JP) .
A-8-215216    4/1997 (JP) .

* cited by examiner

Primary Examiner—Kevin M. Picardat
Assistant Examiner—D. M. Collins
(74) Attorney, Agent, or Firm—Oliff & Berridge, PLC

(57) ABSTRACT

An etching mask is made of a metal such as Permalloy (NiFe) and has a T-shaped cross section made up of a vertical bar having width $W_1$ and a lateral bar having width $W_2$. Through ion beam etching with the etching mask, the region in the surface of a workpiece not covered with the mask is selectively removed by the ion beams applied thereto. In the mask the vertical bar has a region obstructed by the lateral bar and a redeposit portion. As a result, the region of the vertical bar near the interface between the workpiece and the vertical bar that substantially determines the pattern width does not change in width. Consequently, a pattern of the workpiece on which etching has been performed has the top width and bottom width substantially equal to width $W_1$ of the vertical bar of the mask. The pattern is rectangular in cross section.

18 Claims, 14 Drawing Sheets

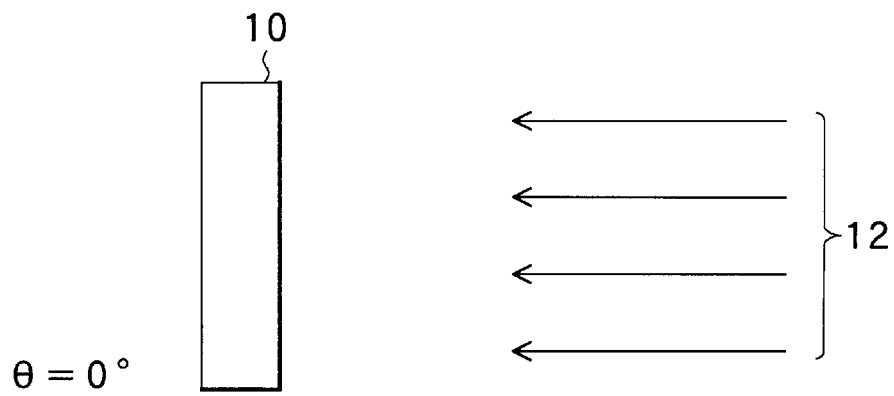
FIG.2A  θ = 0°
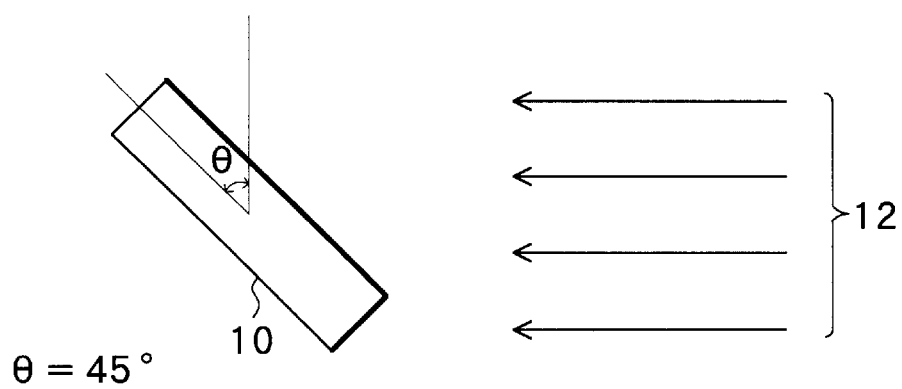
FIG.2B  θ = 45°
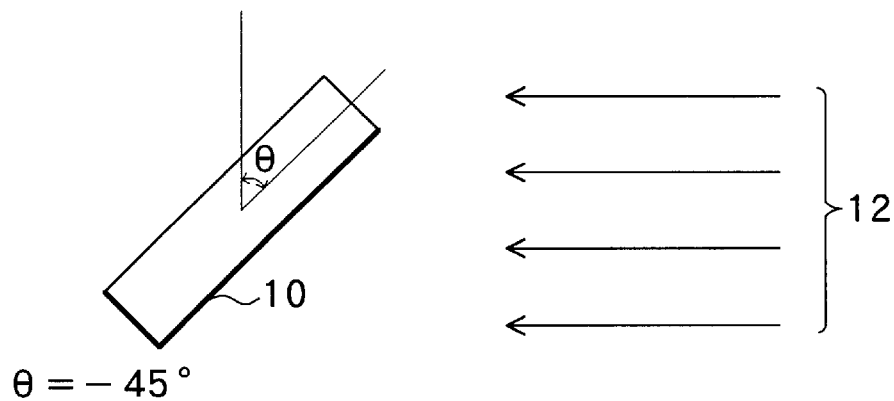
FIG.2C  θ = −45°

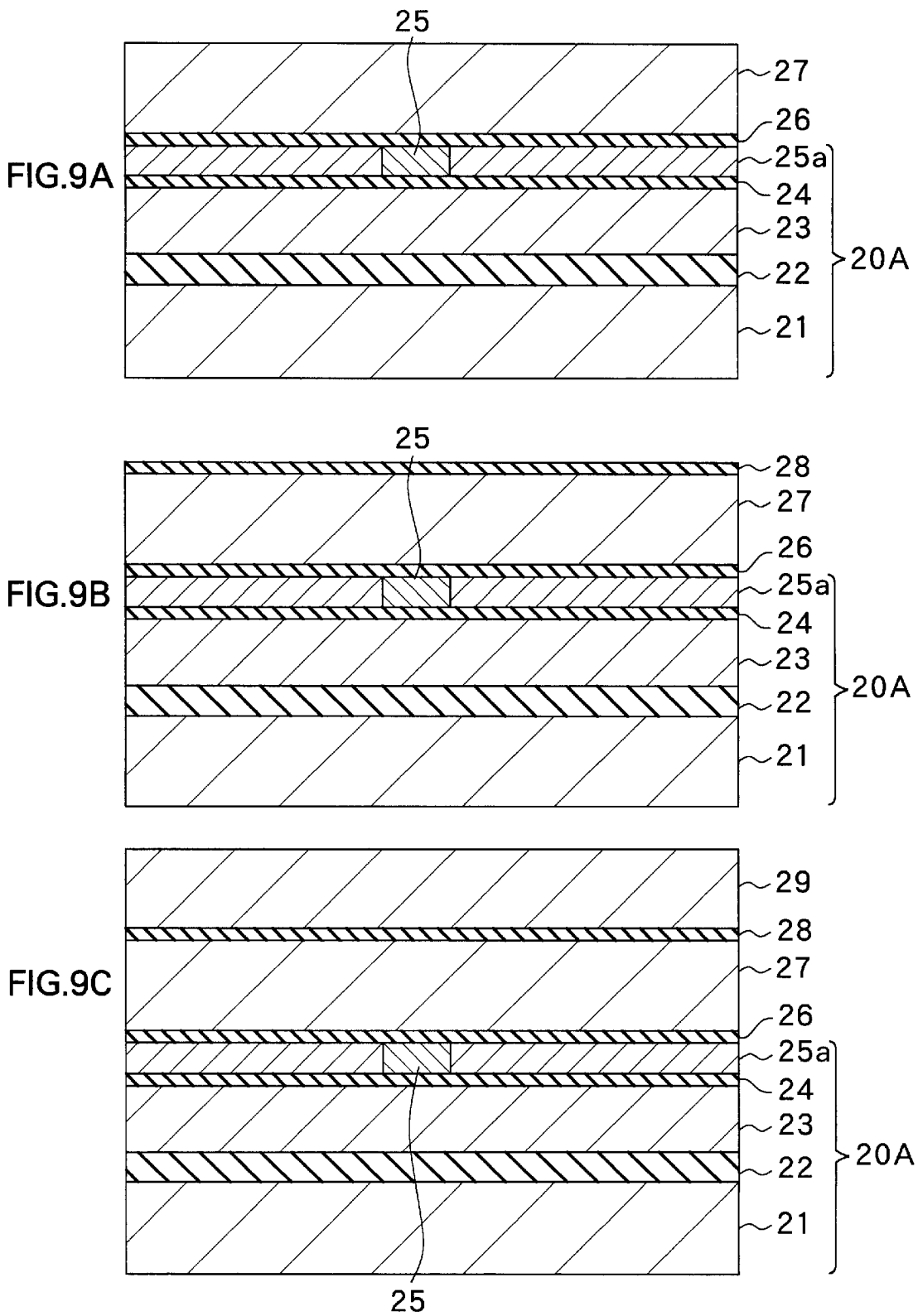

ETCHING MASK, METHOD OF MAKING SAME, ETCHING METHOD, MAGNETIC HEAD DEVICE AND METHOD OF MANUFACTURING SAME

BACKGROUND OF THE INVENTION

1. Field of the Invention

The present invention relates to an etching mask used for micromachining, a method of making the same, an etching method using the etching mask, a magnetic head device and a method of manufacturing the same, which are used for making writing poles and so on of a composite thin-film magnetic head device having a reading head and a writing head, for example.

2. Description of the Related Art

Demands have been increasing for techniques that achieve finer patterns as a reduction has been sought in size and film thickness of a magnetic head device such as a magnetoresistive (MR) head device used for a hard disk unit and various semiconductor devices. Fabrication of a micropattern includes an etching process. Anisotropic etching is required for achieving high etching accuracy in the etching process. Anisotropic etching has such orientation that a sidewall surface of a complete pattern is orthogonal to the surface of a base layer. An example that requires anisotropic etching is a composite thin-film magnetic head device having an inductive reading head and a magnetoresistive writing head. In order to achieve steady performance of the writing head of the magnetic head device, anisotropic etching is required to be performed orthogonally to the substrate for processing the writing pole (top pole) of the head.

As anisotropic etching, dry etching is preferred compared to wet etching achieved through a complete chemical reaction. Dry etching is to evaporate and remove an object, using reactive gas plasma or ion beams thereof. A photoresist is generally used as an etching mask for forming a pattern by dry etching.

One of problems found in such an etching process is that not only the workpiece to be etched but also the mask itself is etched. In the case of dry etching using ion beams, in particular, a photoresist mask is easily deformed since the etching speed of the mask by ion beams is high and the photoresist is sensitive to heat. The photoresist film may be made thick in order to prevent such deformation. However, an increased film thickness makes it difficult to maintain anisotropy of etching, which is not desirable for fine pattern fabrication.

To overcome the foregoing problem, a mask utilizing a metal such as copper (Cu) has been fabricated instead of a heat-sensitive photoresist film.

However, if a metal mask is used, a problem still remains, that is, the top and sidewall surface of the mask are removed together with the workpiece through an ion beam application although the etching speed of the mask is decreased. FIG. 14A to FIG. 14C illustrate such a state. As shown in FIG. 14A, a metal mask 101 is formed on a workpiece 100 and ion beam etching is performed. As shown in FIG. 14B and FIG. 14C, not only the surface of the workpiece 100 but also the top and sidewall surface of the metal mask 101 are removed by ion beams 102. As a result, a sidewall surface 101A of the patterned workpiece 100 is not perpendicular but has a cross section having the shape of a trapezoid whose top width is wider than the bottom width as shown in FIG. 14C. The interface between the sidewall surface 101A and the base layer takes a round shape.

In a composite thin film magnetic head device as mentioned above, in particular, if the cross section of a writing pole formed on a gap layer takes the shape of a trapezoid or the interface between the pole and the gap layer takes a round shape, leakage of magnetic flux results and affects data reading and writing. It is therefore desirable that the top surface of the writing pole layer is horizontal and sidewall surface is perpendicular, that is, the cross section is rectangular.

To achieve such a structure, a method is disclosed in Japanese Patent Application Laid-open Hei 3-252907 (1991) wherein a mask made of a metal (such as a nickel-iron alloy) whose etching speed is nearly similar to that of a workpiece is used. However, it is difficult to maintain sufficient anisotropy in this method, too, since the mask itself is removed through dry etching and part of the removed mask redeposits on the mask, and the mask thickness is required to be substantially thick (3 to 7 $\mu$m) and so on.

SUMMARY OF THE INVENTION

It is a first object of the invention to provide an etching mask and a method of making the same for precisely performing anisotropic etching through dry etching and forming a pattern on a workpiece, the cross section of the pattern being rectangular in shape.

It is a second object of the invention to provide an etching method for forming a pattern whose cross section is rectangular in shape on a workpiece through dry etching using such an etching mask.

It is a third object of the invention to provide a magnetic head device fabricated through the use of such an etching mask, for suppressing flux leakage in a writing pole and achieving stability of writing, and a method of manufacturing such a magnetic head.

An etching mask of the invention is used for selectively etching a workpiece. The mask is made of a metal and has a cross-sectional shape including a rectangular first region that determines a pattern width of the workpiece and a second region that intercepts an application of etching beams to a sidewall of the first region while etching is performed. To be specific, the etching mask is T-shaped in cross section. To be more specific, the cross section includes a vertical bar an end of which comes to contact with a surface of the workpiece and a lateral bar placed on the other end of the vertical bar whose width is greater than that of the vertical bar. The pattern width of the workpiece is determined by the width of the vertical bar. The lateral bar is not necessarily placed on the other end of the vertical bar but may be anywhere along the vertical bar as long as the lateral bar is closer to the other end of the vertical bar.

According to the etching mask, when dry etching such as ion beam etching is performed, the region of the workpiece not covered with the mask is removed by the application of ion beams and the like. At the same time, the beams are applied to the mask itself. However, the beams are not directly applied to the region of the wall of the vertical bar (the first region) obstructed by the lateral bar (the second region). The beams impinge on the region of the vertical bar other than the region obstructed by the lateral bar, and the metal material scatters. Part of the scattered metal redeposits on the region immediately above the point of application of the beam. The redeposit portion intercepts the application of beams to the wall below the redeposit portion. A change in width of the vertical bar is thereby suppressed.

A first method of the invention is provided for making an etching mask made of a metal and having a T-shaped cross section including a vertical bar and a lateral bar. The method includes the steps of: forming a film for mask formation on a workpiece and forming an opening in the film for mask formation, the opening reaching the workpiece and having a specific width; and forming a metal film in the opening and over a region around the opening to form the etching mask and removing the film for mask formation.

In the first method, the thickness of the film for mask formation may be made equal to the height of the vertical bar of the mask, and the width of the opening may be made equal to the width of the vertical bar. The etching mask whose vertical bar has a width and a height as desired is thereby obtained.

A second method of making an etching mask of the invention includes the steps of: forming a film for mask formation having a specific thickness on a workpiece and performing a first exposure on a region of a specific width in the film by such an exposure amount that reaches the workpiece; after the first exposure, forming a T-shaped exposed region by performing a second exposure on a region having a width greater than that of the region exposed through the first exposure by an exposure amount smaller than that of the first exposure; selectively removing the exposed regions of the film for mask formation to form a T-shaped opening; and forming a metal film in the opening of the film for mask formation to form the etching mask and removing the film for mask formation.

In the second method, the thickness of the film for mask formation may be made equal to the height of the mask, the width of the opening of the film for mask formation formed by the first exposure may be made equal to the width of the vertical bar, and the width of the opening formed by the second exposure may be made equal to the width of the lateral bar. The etching mask having a T-shaped cross section whose vertical bar and the lateral bar both have a desired width is thereby obtained.

A third method of making an etching mask of the invention includes the steps of: forming a first film for mask formation on a workpiece and forming a first opening having a specific width that reaches the workpiece in the first film; forming a metal film in the first opening and removing the first film; forming a second film for mask formation on the metal film and the workpiece and then forming a second opening in the second film, the second opening reaching the metal film and having a width greater than that of the metal film; and forming a metal film in the second opening to form the etching mask that is T-shaped in cross section and then removing the second film.

A fourth method of making an etching mask of the invention includes the steps of: forming a first film for mask formation on a workpiece and forming a first opening having a specific width that reaches the workpiece in the first film; forming a metal film in the first opening, forming a second film for mask formation on the metal film and the first film, and then forming a second opening in the second film, the second opening reaching the metal film and having a width greater than that of the metal film; and forming a metal film in the second opening to form the etching mask that is T-shaped in cross section and then removing the first and second films.

In the third or fourth method, the thickness of the first film may be made equal to the height of the vertical bar of the mask, the width of the first opening may be made equal to the width of the vertical bar, and the width of the second opening may be made equal to the width of the lateral bar. The etching mask having a T-shaped cross section whose vertical bar has a desired height and a desired width and lateral bar has a desired width is thereby obtained.

In the foregoing methods of making an etching mask, the metal film is preferably formed by plating such as electroless plating.

An etching method of the invention includes the steps of: forming an etching mask made of a metal and having a T-shaped cross section on a workpiece, and then performing micromachining of the workpiece by dry etching through the use of the etching mask. A fine pattern having a rectangular cross section is thereby obtained.

A magnetic head device of the invention comprises an inductive writing head including a first writing pole, a second writing pole corresponding to the first writing pole, and a gap layer placed between the first and second writing poles. The second writing pole has a rectangular cross section whose sidewall is substantially orthogonal to a surface of the gap layer. Such a configuration allows the first and second writing poles to perform writing without flux leakage.

Another magnetic head device of the invention comprises an inductive writing head including a first writing pole, a second writing pole corresponding to the first writing pole, and a gap layer placed between the first and second writing poles. At least part of the first writing pole, the gap layer and the second writing pole are equal to one another in width and each have a rectangular cross section whose sidewall is substantially orthogonal to a surface of a base layer. Such a configuration allows the first and second writing poles to perform writing without flux leakage.

Still another magnetic head device of the invention comprises an inductive writing head including a first writing pole, a second writing pole corresponding to the first writing pole, and a gap layer placed between the first and second writing poles. The gap layer and the first writing pole are formed through dry etching using an etching mask made of a magnetic material and having a T-shaped cross section, and the etching mask is the second writing pole. Writing is performed by the first and second writing poles formed with the etching mask.

A method of the invention is provided for manufacturing a magnetic head device comprising an inductive writing head including a first writing pole, a second writing pole corresponding to the first writing pole, and a gap layer placed between the first and second writing poles. The method includes the steps of: stacking a layer to be the first writing pole, the gap layer, and a layer to be the second writing pole in this order and then forming an etching mask made of a metal and having a T-shaped cross section on the layer to be the second writing pole; and selectively removing the layer to be the second writing pole by dry etching using the etching mask to form a rectangular cross section.

Another method of manufacturing a magnetic head device of the invention includes the steps of: stacking a layer to be the first writing pole, the gap layer, and a layer to be the second writing pole in this order and then forming an etching mask made of a metal and having a T-shaped cross section on the layer to be the second writing pole; and selectively removing the layer to be the second writing pole, the gap layer, and a region to the middle in depth of the layer to be the first writing pole in this order by dry etching using the etching mask to form a rectangular cross section.

Still another method of manufacturing a magnetic head device of the invention includes the steps of: stacking a layer to be the first writing pole and the gap layer, and then forming an etching mask made of a magnetic material and having a T-shaped cross section to be the second writing pole on the gap layer; and selectively removing the gap layer and a region to the middle in depth of the layer to be the first writing pole in this order by dry etching using the etching mask to form a rectangular cross section.

In the methods described above, it is preferred that any of the methods of making an etching mask of the invention is applied to the step of forming the etching mask.

Other and further objects, features and advantages of the invention will appear more fully from the following description.

BRIEF DESCRIPTION OF THE DRAWINGS

FIG. 2A to FIG. 2C are views for illustrating an etching method using the etching mask shown in FIG. 1A to FIG. 1D.

FIG. 9A to FIG. 9C are cross sections of manufacturing steps for illustrating a method of manufacturing a magnetic head device using the etching mask shown in FIG. 1A to FIG. 1D.

DETAILED DESCRIPTION OF THE PREFERRED EMBODIMENTS

Preferred embodiments of the invention will now be described in detail with reference to the accompanying drawings.

[Etching Mask and Method of Making Same]

Figure 1A:
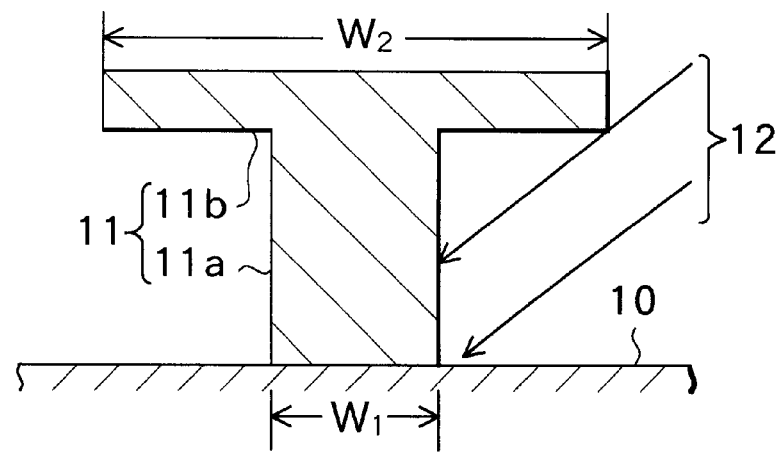
FIG. 1A to FIG. 1D are cross sections of manufacturing steps for illustrating the configuration and function of an etching mask of an embodiment of the invention.

Reference is made to FIG. 1A for describing the configuration of an etching mask of an embodiment of the invention. The etching mask 11 is formed on a workpiece 10 made of an iron (Fe) base metal, for example. The mask 11 is made of a metal and has a T-shaped cross section made up of a vertical bar 11a having width $W_1$ and a lateral bar 11b having width $W_2$. The vertical bar 11a corresponds to a first region of the invention that is not etched by etching beams. The lateral bar 11b corresponds to a second region of the invention that intercepts the application of etching beams to the sidewall surface of the vertical bar 11a. A metal forming the mask 11 may be any of Permalloy (nickel-iron) (NiFe), nickel-boron (NiB), nickel-phosphorus (NiP), copper (Cu), gold (Au), an alloy including cobalt (Co) or tantalum (Ta) and other metals. If the workpiece is made of a metal, in particular, the above-listed metals that may be formed through plating are preferred. If the mask 11 is made of a magnetic material such as Permalloy, the mask itself may be utilized as a pole as described below.

The workpiece 10 processed with the mask 11 may be any of a thin film of a metal such as a magnetic substance, an inorganic compound thin film, an organic compound thin film, glass, a film made of a material such as a semiconductor, a substrate and so on. On the workpiece 10 the mask may be formed by electroless plating as plating described below. To be specific, the workpiece 10 may be an electrode layer formed on a semiconductor wafer. The electrode layer may be made of a metal such as copper (Cu), gold (Au), Permalloy (NiFe), and iron (F). In a magnetic disk apparatus, the electrode layer may be made of an iron base metal with high magnetic density (Hi-Bs).

The etching mask 11 of the embodiment is particularly suitable for formation of a micro-pattern of 5.0 μm or below. The width of the vertical bar 11a of the mask 11 depends on the pattern width. The height of the vertical bar 11a is preferably 0.5 to 5.0 μm. The lateral bar 11b is preferably 0.5 to 1.5 μm in width and 0.5 to 2.0 in thickness.

Referring to FIG. 1A to FIG. 1D, the function of the etching mask 11 will now be described.

Figure 1B:
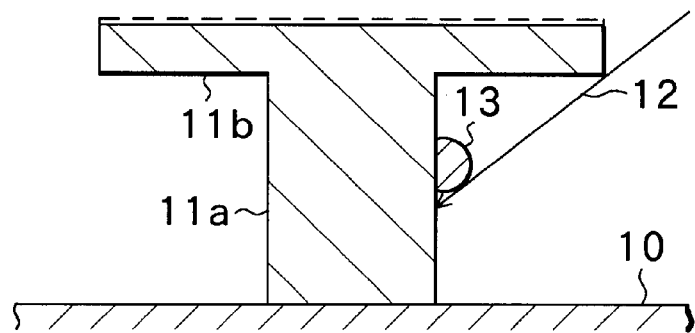
Figure 1C:
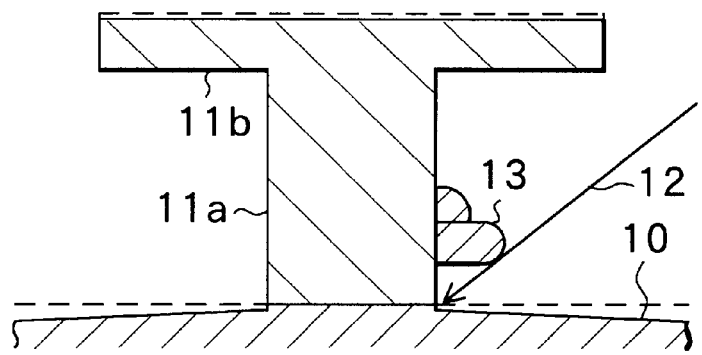
Figure 1D:
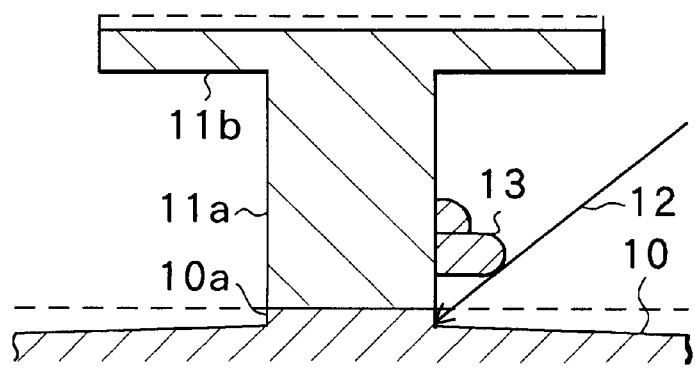

As shown in FIG. 1A, dry etching such as ion beam etching is performed, using the etching mask 11. The region in the surface of the workpiece 10 not covered with the mask 11 is selectively removed by the ion beams 12 applied thereto. At the same time, some portion of the lateral bar 11b of the mask 11 is removed. The region of the vertical bar 11a obstructed by the lateral bar 11b is not removed by the ion beams 12. In contrast, the ion beams 12 are applied to the region of the vertical bar 11a not obstructed by the lateral bar 11b and the metal material is removed. However, the metal material removed from the workpiece 10 redeposits on the wall of the vertical bar 11a. In addition, as shown in FIG. 1B to FIG. 1D, part of the metal material removed from the vertical bar 11a and scattered redeposits in the region immediately above the point of application of the ion beam 12 on the vertical bar 11a. As a result, the width of the vertical bar 11a is partly increased. The region below the portion of the wall of the vertical bar 11a where the metal material redeposits (redeposit portion 13) is obstructed by the redeposit portion 13. The ion beams 12 are therefore not directly applied to the region.

In the etching mask 11, the vertical bar 11a has the region obstructed by the lateral bar 11b and the region obstructed by the redeposit portion 13 of the scattered metal material. As a result, the region of the vertical bar 11a near the interface between the workpiece 10 and the vertical bar 11a that determines the pattern width does not change in width as etching proceeds. Although the lateral bar 11b of the mask 11 is removed to some extent and the width and thickness thereof are changed, the lateral bar 11b reduced in size will not affect the pattern width. Consequently, as shown in FIG. 1D, a pattern 10a of the workpiece 10 on which etching is performed has the top width and bottom width substantially equal to width $W_1$ of the vertical bar 11a of the mask 11. That is, the sidewall of the pattern 10a is perpendicular and the pattern 10a is rectangular in cross section. As thus described, anisotropic etching through dry etching is accomplished with reliability by using the etching mask 11 having the T-shaped cross section.

There are some ion beam etching apparatuses that apply the ion beams 12 in a horizontal direction. In such an ion beam etching apparatus dust in the atmosphere falls on the surface of the workpiece 10 if the workpiece 10 is vertically placed (etching angle θ=0 degree) as shown in FIG. 2A or the workpiece 10 is placed such that the surface is up (θ=45 degrees) as shown in FIG. 2B. Therefore, in the etching process using the mask 11 of the embodiment, it is preferred that the workpiece 10 is placed such that the surface is down (θ=−45 degrees) as shown in FIG. 2C so as to prevent dust from depositing on the workpiece 10.

Besides ion beam etching as described above, plasma etching, reactive ion etching (RIE) and so on may be applied to the dry etching using the mask 11 of the embodiment. However, if reactive ion etching or plasma etching using a reactive gas is applied, variations may result in the etching state of the layers due to the reactive gas when the film to be etched comprises a plurality of layers that form the writing head of a magnetic head device described below, for example. Nonreactive ion beam etching using an inactive gas is therefore preferred when the film to be etched comprises a plurality of layers.

For ion beam etching an etching gas of oxygen ($O_2$), argon (Ar), nitrogen ($N_2$), hydrogen ($H_2$), or a halogen gas such as carbon tetrafluoride ($CF_4$) may be used. The pressure of the atmosphere is preferably about $10^{-2}$ Pa. The upper limit of power is preferably 1000 V and 800 mA. The etching duration depends on the film thickness and the metal material but preferably falls within the range of 10 to 60 minutes. The ion beam application angle (etching angle) with respect to the workpiece 10 preferably falls within the range of 0 to 90 degrees.

Four types of processes will now be described as methods of making the etching mask 11. In the following description like numerals are assigned to like components in the processes.

[First Method]

Figure 3A:
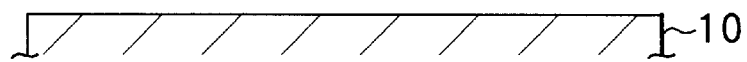
FIG. 3A to FIG. 3E are cross sections of manufacturing steps for illustrating a first method of making the etching mask shown in FIG. 1A to FIG. 1D.
Figure 3B:
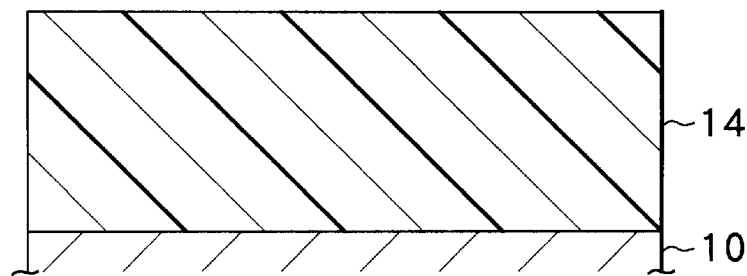
Figure 3C:
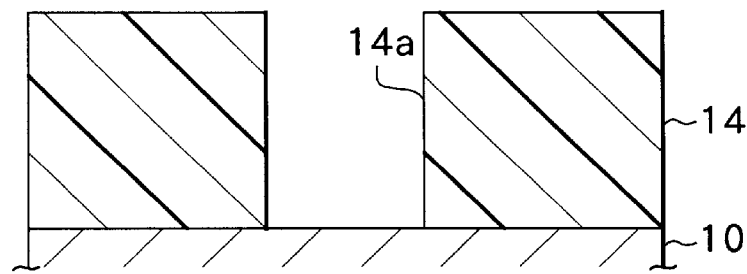
Figure 3D:
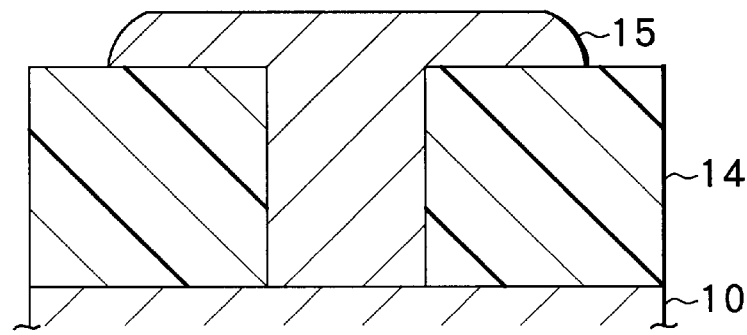
Figure 3E:
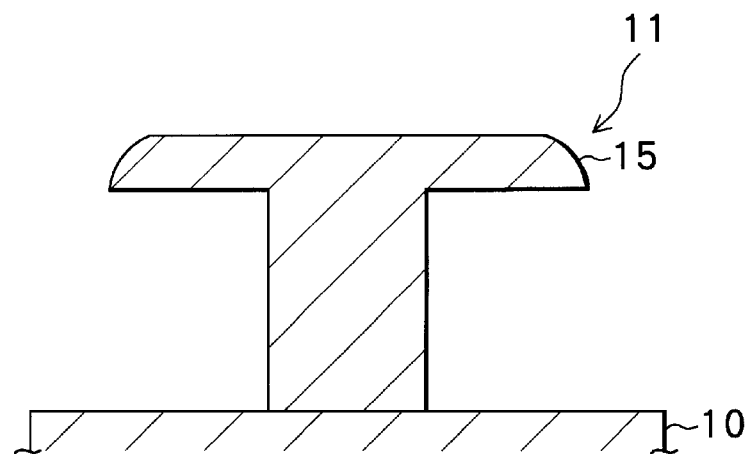

On the workpiece 10 such as an electrode film shown in FIG. 3A, a photoresist film 14 of 2 to 5 μm in thickness, for example, is applied as shown in FIG. 3B. The photoresist film 14 may be a novolak base positive resist. Next, as shown in FIG. 3C, the photoresist film 14 is exposed and developed to form a pattern having an opening 14a whose width is equal to width $W_1$ of the vertical bar of the mask 11. Next, as shown in FIG. 3D, plating is performed on the opening 14a of the photoresist film 14 and the region around the opening 14a to form a plating film 15. The photoresist film 14 is then removed from the workpiece 10 through the use of acetone and the like. The etching mask 11 having the T-shaped cross section as shown in FIG. 3E is thus obtained.

Plating may be either electroless plating or electroplating. Electroless plating has the advantage in that plating is performed in a simpler apparatus compared to electroplating. Through electroless plating the film growing speed is reduced and a fine pattern is formed by appropriately adjusting the temperature and hydrogen-ion concentration (pH) of the solution used for plating. The etching mask of high hardness is thereby obtained and the thickness thereof is precisely controlled.

If the film to be processed as the base of plating is made of an iron base material, an appropriate pretreatment improves spreading of the plating surface to a great extent. Such a pretreatment may be such that the semiconductor wafer on which the film to be processed is formed is soaked in a 4.5% hydrochloric acid (HCl) solution for about 1.5 minutes to give wettability to the plating surface.

The pH of the solution is preferably 7.0 or below. The more preferable range is pH 5.0 to 6.8. A sufficient hardness of the etching mask is obtained if the pH falls within the range.

In the step shown in FIG. 3D, the thickness of the plating film 15 from the surface of the photoresist film 14 is of a specific value (1.0 μm, for example) or above so that the lateral bar 11b described above will not be completely removed through etching with the ion beams 12. The thickness of the plating film 15 is controllable by the temperature of the plating solution and the plating duration (1 to 30 minutes, for example). The temperature of the solution may be 50 to 90° C. or preferably 60° C., the thermal effect being considered, so as to prevent the photoresist film 14 from deforming. The plating duration is determined in relation to the temperature.

The etching mask 11 is easily made through the first method with a relatively few steps.

[Second Method]

Figure 4A:
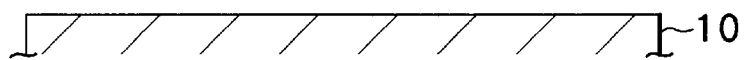
FIG. 4A to FIG. 4D are cross sections of manufacturing steps for illustrating a second method of making the etching mask shown in FIG. 1A to FIG. 1D.
Figure 4B:
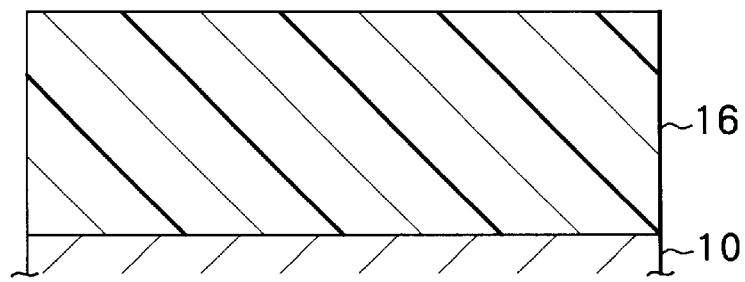
Figure 4C:
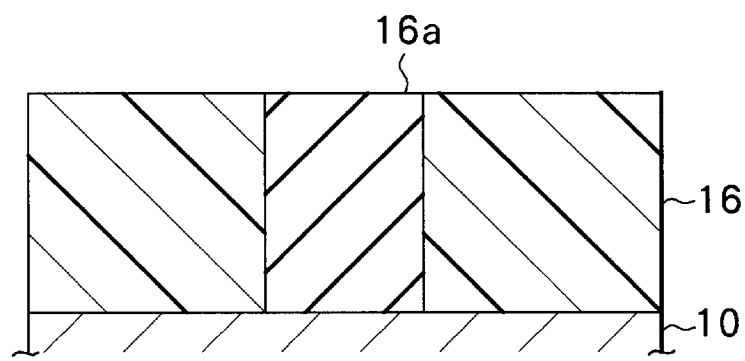
Figure 4D:
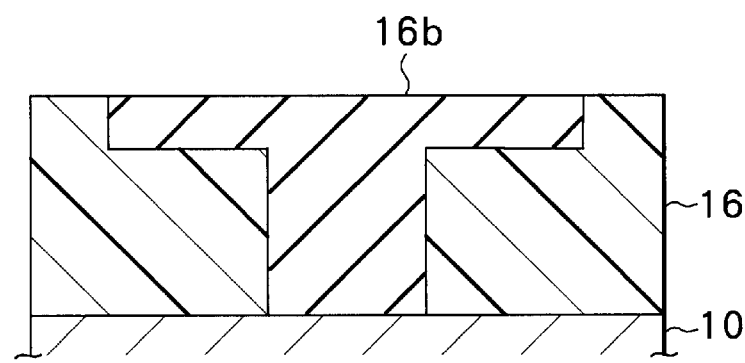

On the workpiece 10 shown in FIG. 4A, a photoresist film 16 of 2 to 5 μm in thickness, for example, that corresponds to the height of the etching mask, is applied as shown in FIG. 4B. The photoresist film 16 may be a novolak base positive resist. Next, as shown in FIG. 4C, a region 16a of the photoresist film 16 whose width is equal to width $W_1$ of the etching mask (the vertical bar) is selectively exposed (a first exposure). Next, as shown in FIG. 4D, a region 16b of the photoresist film 16 whose width is equal to width $W_2$ of the etching mask (the lateral bar) is exposed (a second exposure) wherein the amount of exposure is smaller than the first exposure. To be specific, the amount of the second exposure is about a hundredth of the first exposure. The exposed region is thereby T-shaped.

Figure 5A:
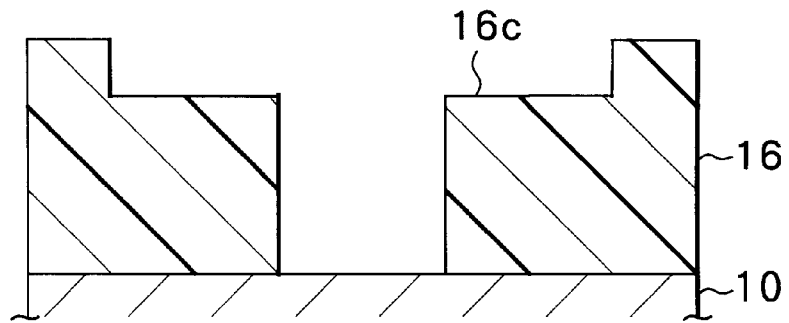
FIG. 5A to FIG. 5C are cross sections that follow the step shown in FIG. 4D.
Figure 5B:
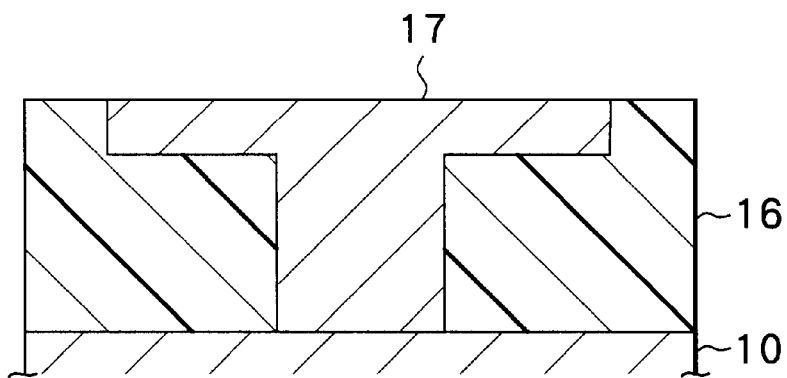
Figure 5C:
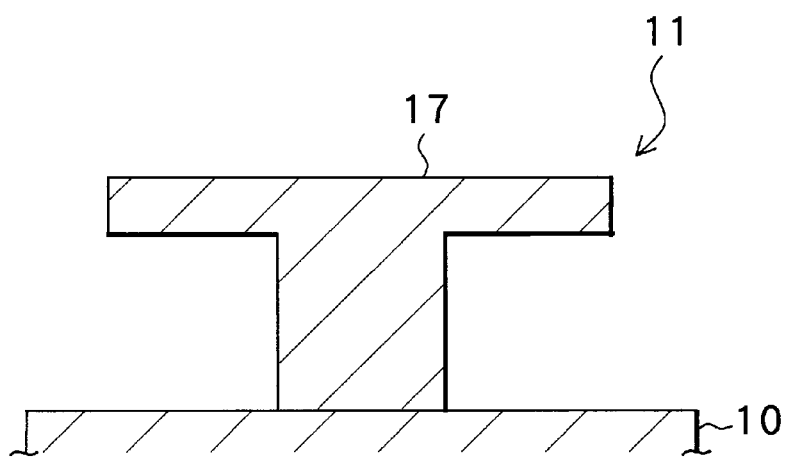

Next, as shown in FIG. 5A, a T-shaped opening 16c is formed in the photoresist film 16 through developing the exposed region. As shown in FIG. 5B, plating is performed as in the first method to form a T-shaped plating film 17 in the opening 16c. The photoresist film 16 is then removed from the workpiece 10 through the use of acetone and the like. The etching mask 11 having the T-shaped cross section as shown in FIG. 5C is thus obtained.

In the second method, although the number of steps is greater than that of the first method, the widths of the vertical bar 11a and the lateral bar 11b of the mask 11 are more precisely controlled compared to the first method.

[Third Method]

Figure 6A:
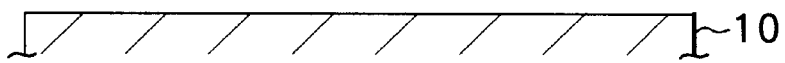
FIG. 6A to FIG. 6E are cross sections of manufacturing steps for illustrating a third method of making the etching mask shown in FIG. 1A to FIG. 1D.
Figure 6B:
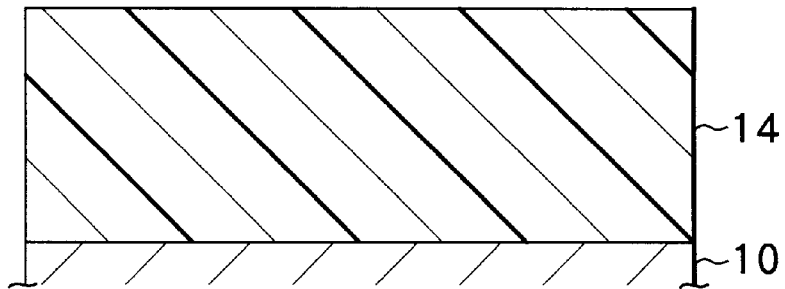
Figure 6C:
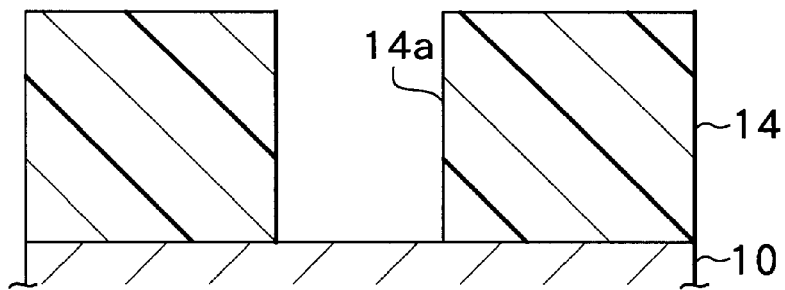
Figure 6D:
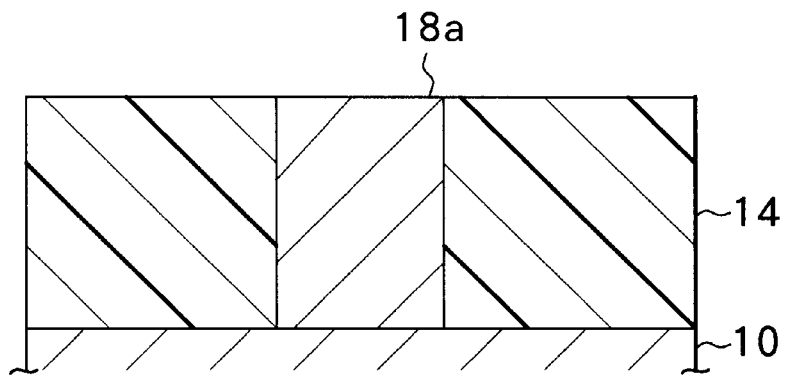
Figure 6E:
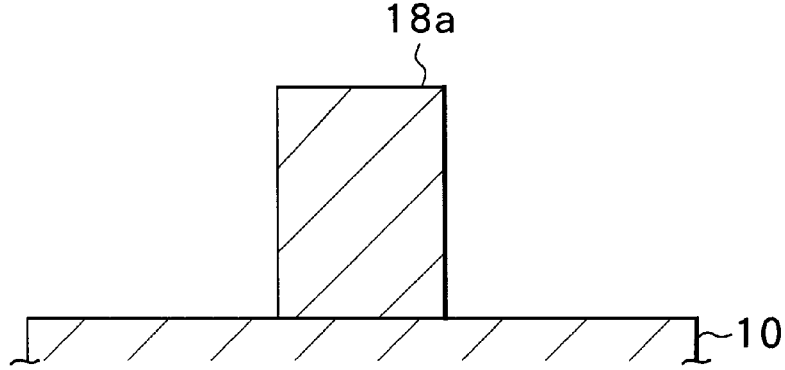

As in the first method, on the workpiece 10 shown in FIG. 6A, the photoresist film 14 of 2 to 5 μm in thickness, for example, that corresponds to the height of the vertical bar 11a of the mask, is applied as shown in FIG. 6B. Next, as shown in FIG. 6C, the photoresist film 14 is exposed and developed to form a pattern having an opening 14a whose width is equal to width $W_1$ of the mask (the vertical bar). Next, as shown in FIG. 6D, plating is performed as in the first method to form a plating film 18a in the opening 14a. The photoresist film 14 is then removed from the workpiece 10 through the use of acetone and the like as shown in FIG. 6E.

Figure 7A:
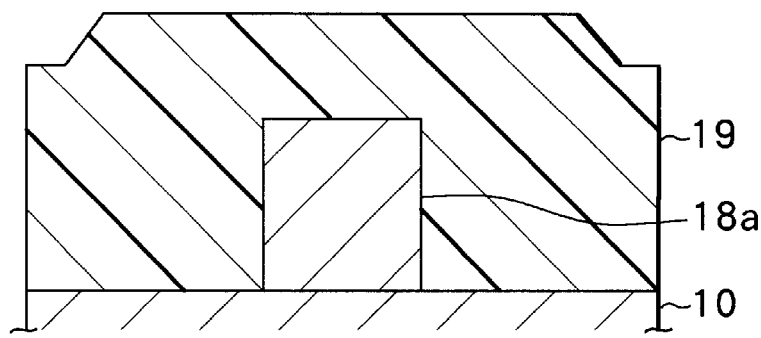
FIG. 7A to FIG. 7D are cross sections that follow the step shown in FIG. 5E.
Figure 7B:
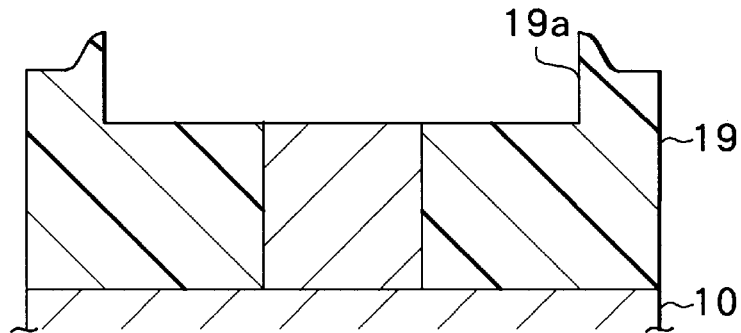
Figure 7C:
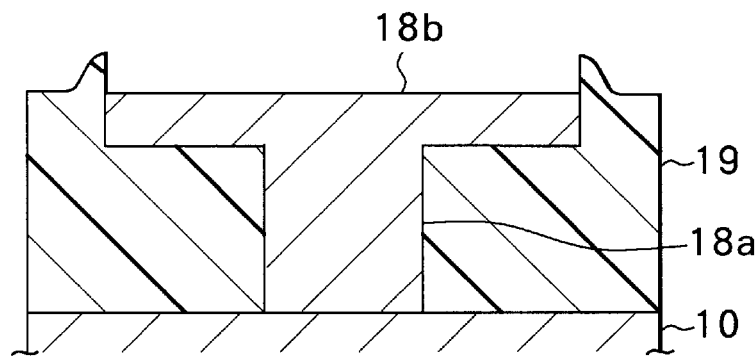
Figure 7D:
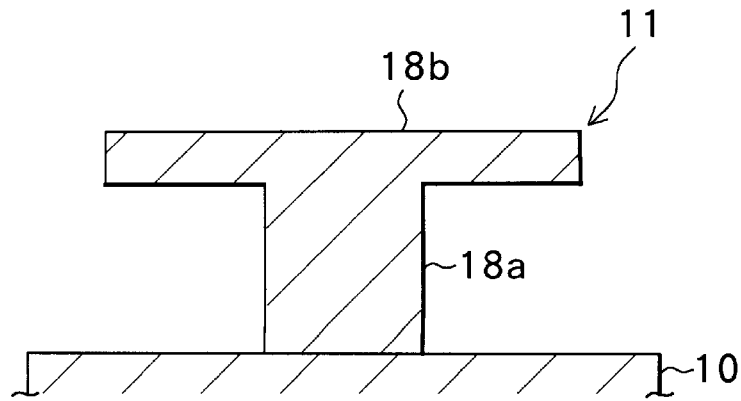

As shown in FIG. 7A, a photoresist film 19 of 2.5 to 7 μm in thickness, for example, which is equal to or more than the height of the etching mask, is applied. Next, as shown in FIG. 7B, the photoresist film 19 is exposed and developed to form a pattern having an opening 19a whose width is equal to width $W_2$ of the mask (the lateral bar). Next, as shown in FIG. 7C, plating is performed to form a plating film 18b in the opening 19a. As shown in FIG. 7D, the photoresist film 19 is then removed from the workpiece 10 through the use of acetone and the like. The etching mask 11 having the T-shaped cross section is thus obtained.

In the third method, although the number of steps is greater than that of the first or second method, the height and width of the vertical bar 11a of the mask 11 and the width of the lateral bar 11b are more precisely controlled.

[Fourth Method]

Figure 8A:
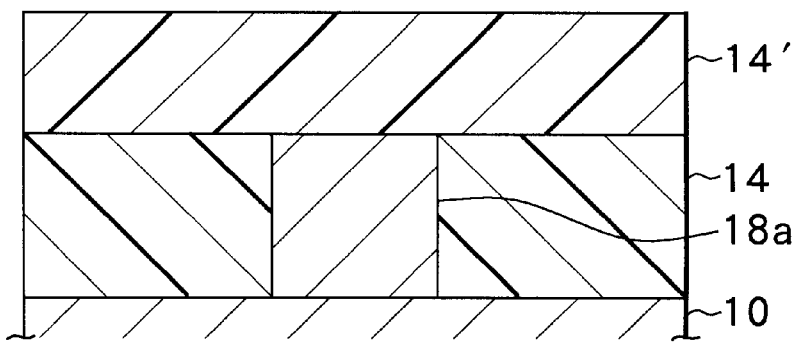
FIG. 8A to FIG. 8D are cross sections of manufacturing steps for illustrating a fourth method of making the etching mask shown in FIG. 1A to FIG. 1D.
Figure 8B:
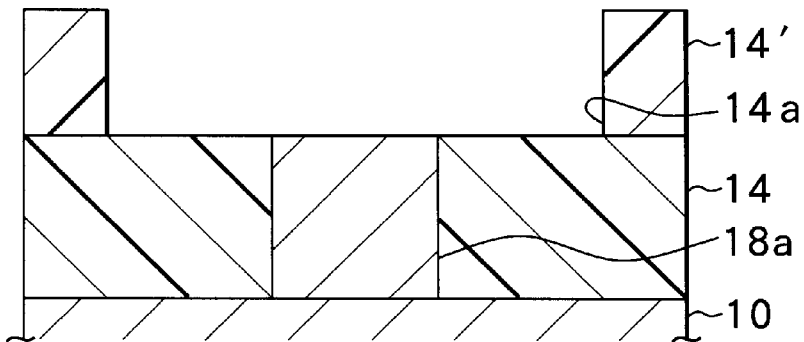
Figure 8C:
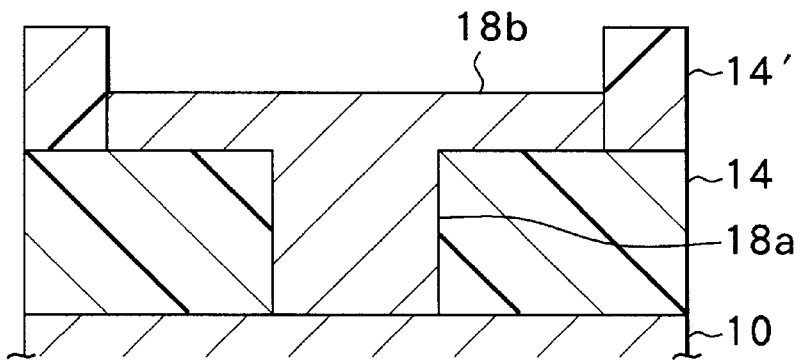
Figure 8D:
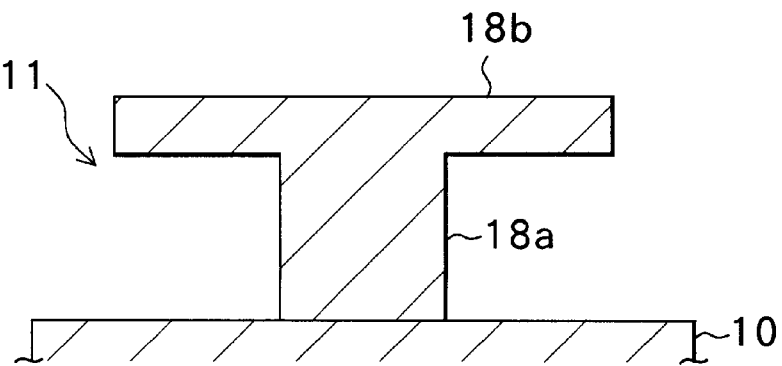

In the fourth method, the steps illustrated in FIG. 6A to FIG. 6D are similar to those of the third method and the descriptions thereof are omitted. In the step illustrated in FIG. 6D of the fourth method, the plating film 18a is formed in the opening 14a of the photoresist film 14. As shown in FIG. 8A, a photoresist film 14' of 1 to 5 µm in thickness, for example, which is equal to or more than the thickness of the lateral bar 11b, is applied. Next, as shown in FIG. 8B, the photoresist film 14' is exposed and developed to form a pattern having an opening 14'a whose width is equal to width $W_2$ of the mask (the lateral bar). Next, as shown in FIG. 8C, plating is performed to form the plating film 18b in the opening 14'a. As shown in FIG. 8D, the photoresist film 14' is then removed from the workpiece 10 through the use of acetone and the like. The etching mask 11 having the T-shaped cross section is thus obtained.

In the fourth method, the height and width of the vertical bar 11a of the mask 11 and the width of the lateral bar 11b are precisely controlled as in the third method. In the third method, after the photoresist film 14 of the first layer is removed, the photoresist film 19 is formed to cover the plating film 18a corresponding to the vertical bar 11a as shown in FIG. 7A. Consequently, when the second exposure is performed to form the lateral bar 11b, the portion (the sidewall portion) corresponding to the vertical bar 11a of the photoresist film 19 reacts as well. It may be therefore difficult to maintain the height of the plating film 18a, that is, the vertical bar 11a. It is thus required that the photoresist film 19 is made of a negative resist if the photoresist film 14 is made of a positive resist. In the fourth method, in contrast, the photoresist film 14' of the second layer is formed without removing the photoresist film 14 of the first layer. As a result, there is no chance that the photoresist film 14 reacts when the second exposure is performed. The height of the plating film 18a, that is, the vertical bar 11a is thus precisely maintained by the thickness of the photoresist film 14.

The etching mask made through the foregoing methods may be applied to micromachining of various devices. The mask is particularly suitable for manufacturing of a magnetic head device.

[Magnetic Head Device and Method of Manufacturing Same]

As an example of the magnetic head device, a composite thin film magnetic head device and a method of manufacturing the same will now be described.

Figure 11:
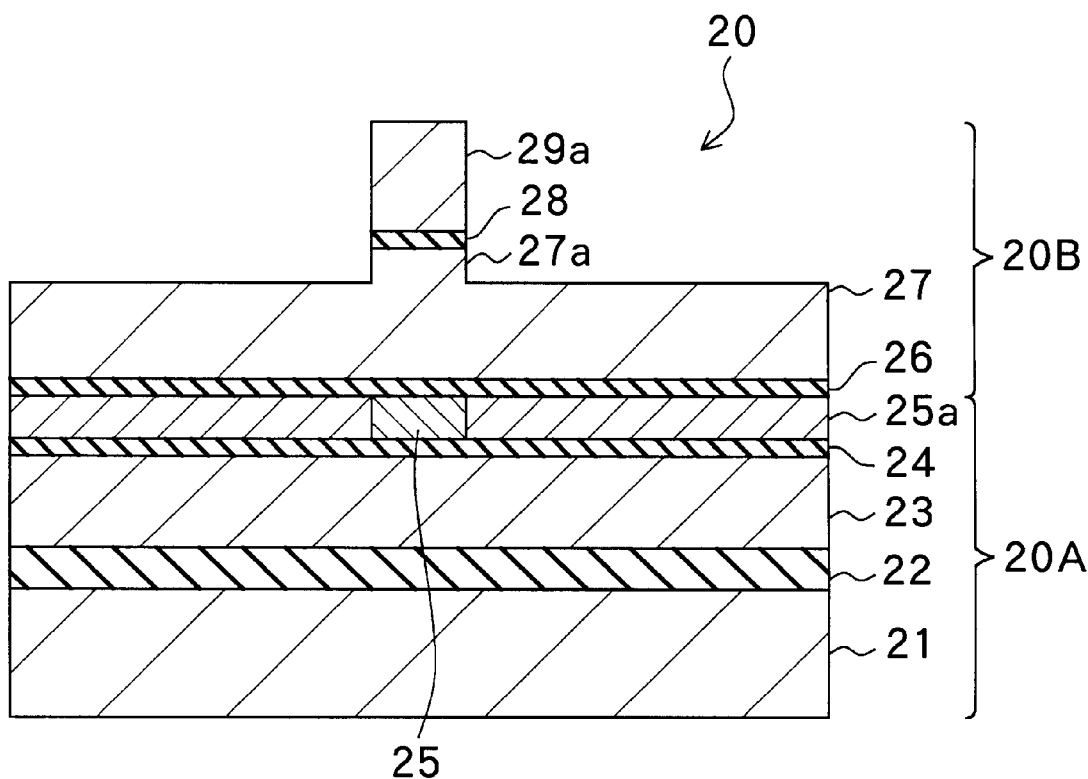
FIG. 11 is a cross section of the magnetic head device obtained after the step shown in FIG. 10B.

FIG. 11 is an example of a cross section of the composite magnetic head device. The magnetic head device 20 includes a magnetoresistive reading head 20A for reproduction and an inductive writing head 20B for recording. In FIG. 11 the writing head 20B is stacked on the reading head 20A. The layers are placed on a slider (not shown). The order in which the layers are stacked is not limited to this example.

The reading head 20A includes a magnetoresistive (MR) layer 25 formed on a substrate 21 made of aluminum oxide and titanium carbide ($Al_2O_3$—TiC), for example, with a base layer 22 made of aluminum oxide ($Al_2O_3$), for example, of 5 µm in thickness, a bottom shield layer 23 made of iron aluminum silicide (FeAlSi), for example, of 2 µm in thickness, and a gap layer 24 made of aluminum oxide ($Al_2O_3$), for example, of 0.1 µm in thickness, in between. On the gap layer 24 a lead terminal layer 25a made of a material such as tantalum (Ta) or tungsten (W) that is not diffused into the MR layer is formed. The lead terminal layer 25a is electrically connected to the MR layer 25. The MR layer 25 is made of a material that exhibits the magnetoresistive effect such as Permalloy (NiFe) or a nickel (Ni)-cobalt (Co) alloy. Besides an anisotropic magnetoresistive film, the MR layer 25 may be made of any other type of film such as a giant magnetoresistive film like a tunnel junction effect film or a spin valve layer.

The writing head 20B includes a top writing pole 29a formed on the reading head 20A with a gap layer 26 made of aluminum oxide ($Al_2O_3$), for example, of 0.1 µm in thickness, a top shield layer 27 made of Permalloy (NiFe), for example, of 3 µm in thickness, and a gap layer 28 made of aluminum oxide ($Al_2O_3$), for example, of 0.3 µm in thickness, in between. The top writing pole 29a corresponds to a second writing pole in the embodiment. The top writing pole 29a is made of Permalloy (NiFe), for example. Although not shown, the gap layer 28 and the top writing pole 29a are covered with an insulating layer made of aluminum oxide ($Al_2O_3$), for example. In the writing head 20B, a bottom writing pole 27a opposed to the top writing pole 29a is made through forming part of the surface of the top shield layer 27 into a projection. The bottom writing pole 27a is equal to the top writing pole 29a and the gap layer 28 in width, that is, the sidewall of the pole 27a is substantially orthogonal to the base layer (the top shield layer 27). The bottom writing pole 27a is rectangular in cross section. The bottom writing pole 27a corresponds to a first writing pole in the embodiment.

In the magnetic head device 20, the reading head 20A reads data from a magnetic disk not shown through the use of the magnetoresistive effect of the MR layer 25. The writing head 20B writes data on the magnetic disk through the use of changes in flux between the top pole 29a and the bottom pole 27a. Since the sidewalls of the top pole 29a, the gap layer 28 and the bottom pole 27a of the writing head 20B are orthogonal to the base layer, no flux leakage results and writing is steadily performed.

Referring to FIG. 9A to FIG. 9C through FIG. 11, a method of manufacturing the magnetic head device 20 will now be described.

As shown in FIG. 9A, on the substrate 21 made of aluminum oxide and titanium carbide ($Al_2O_3$—TiC), for example, the base layer 22 made of aluminum oxide ($Al_2O_3$), for example, the bottom shield layer 23 made of iron aluminum silicide (FeAlSi), for example, the gap layer 24 made of aluminum oxide ($Al_2O_3$), for example, and the MR layer 25 made of Permalloy (NiFe) are formed in this order. The lead terminal layer 25a made of tantalum (Ta) is formed to be electrically connected to the MR layer 25. The reading head 20A is thus formed. Next, on the reading head 20A, the gap layer 26 made of aluminum oxide ($Al_2O_3$), for example, and the top shield layer 27 made of Permalloy (NiFe), for example, to be the bottom writing pole as well, are formed. Next, as shown in FIG. 9B, the gap layer 28 made of aluminum oxide ($Al_2O_3$), for example, is formed on the top shield layer 27. As shown in FIG. 9C, the top writing pole layer 29 made of Permalloy (NiFe), for example, is formed on the gap layer 28. The foregoing layers are easily formed through known techniques such as layer formation methods like sputtering and photolithography.

Figure 10A:
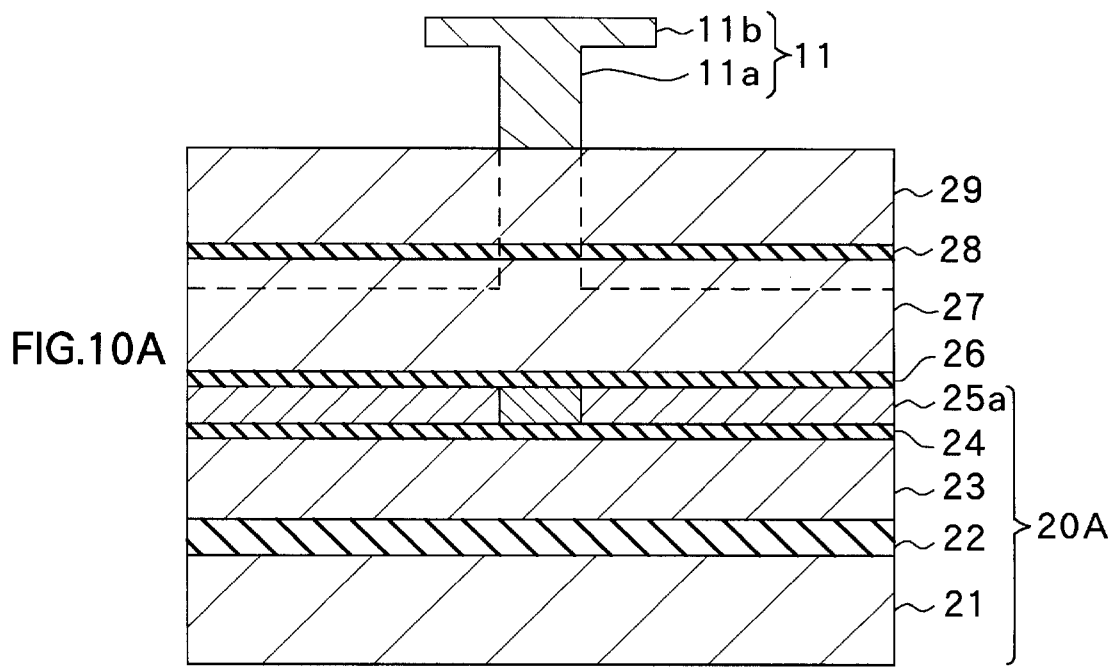
FIG. 10A and FIG. 10B are cross sections that follow the step shown in FIG. 9C.
Figure 10B:
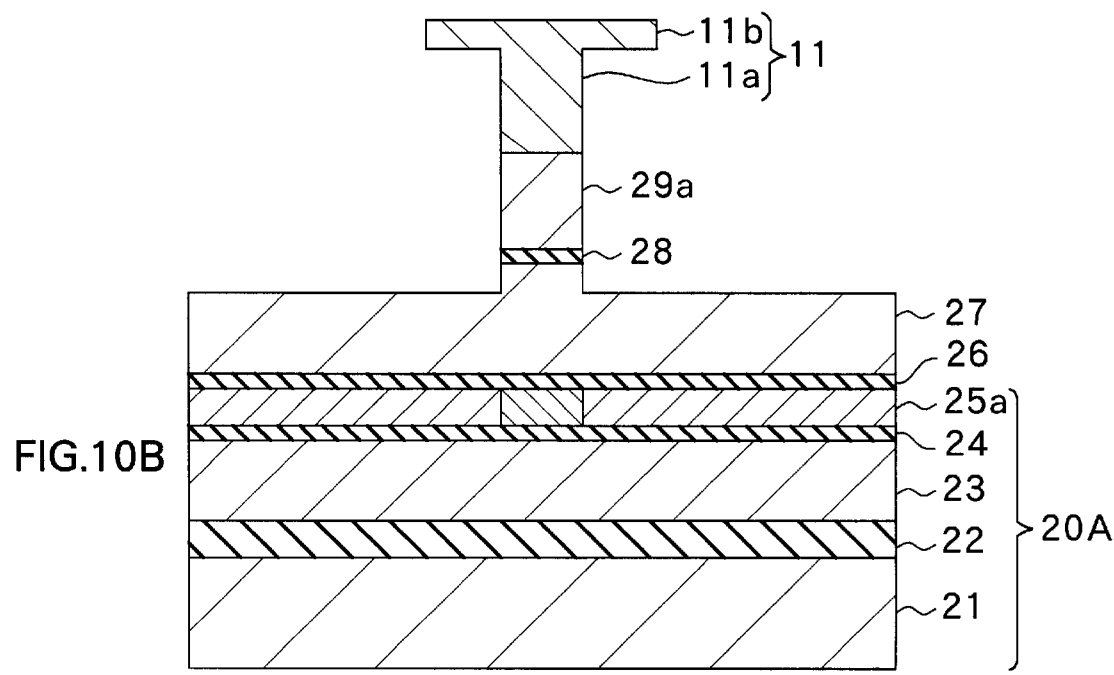

In the embodiment, after the top writing pole layer 29 is formed, the etching mask 11 is formed as shown in FIG. 10A through any of the foregoing methods. Next, the top writing pole layer 29, the gap layer 28, and the surface of the top shield layer 27 are selectively removed, as shown with the broken line, by dry etching such as ion beam etching through the use of the mask 11. Consequently, as shown in FIG. 10B, the top writing pole 29a whose width is equal to width $W_1$ of the mask 11 is formed. The bottom writing pole layer 27a is formed in a self-aligned manner to be equal to the top writing pole 29a in width. The mask 11 is then removed from the top writing pole 29a by immersing into a removing agent. The magnetic head device 20 shown in FIG. 11 is thus obtained.

According to the embodiment of the invention thus described, the magnetic head device 20 is obtained through the use of the etching mask 11 having the T-shaped cross section. The magnetic head device 20 comprises the top writing pole 29a and the bottom writing pole 27a each having a width equal to width $W_1$ of the mask 11 and a rectangular cross section.

Figure 12A:
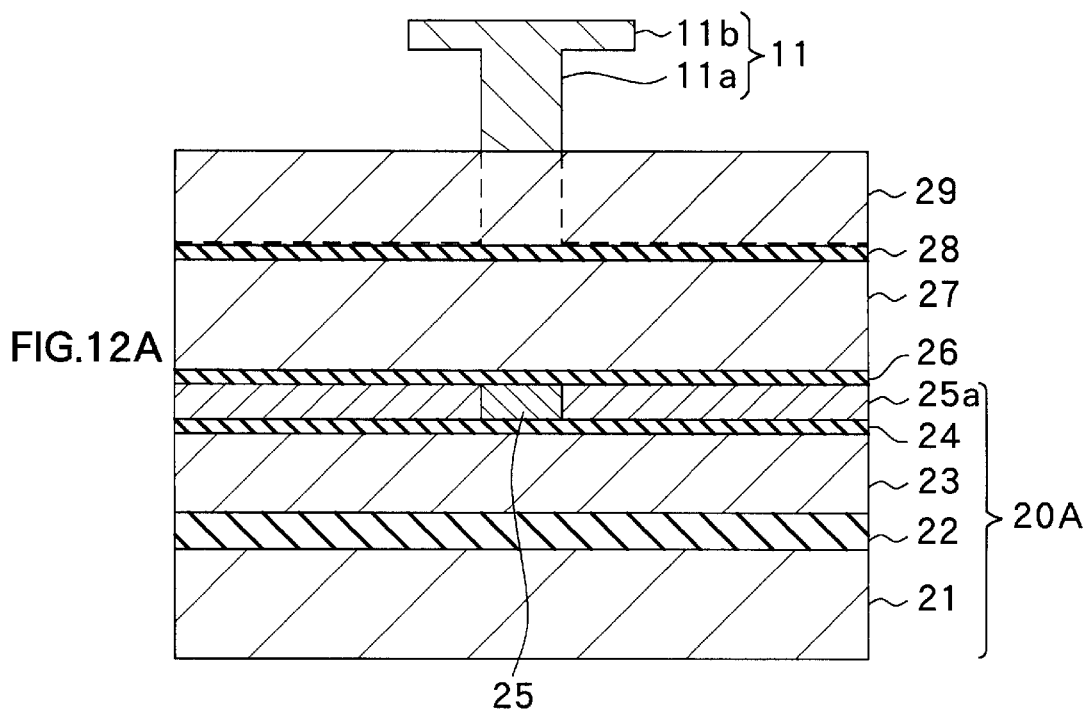
FIG. 12A and FIG. 12B are cross sections of manufacturing steps for illustrating a method of manufacturing another magnetic head device using the etching mask shown in FIG. 1A to FIG. 1D.
Figure 12B:
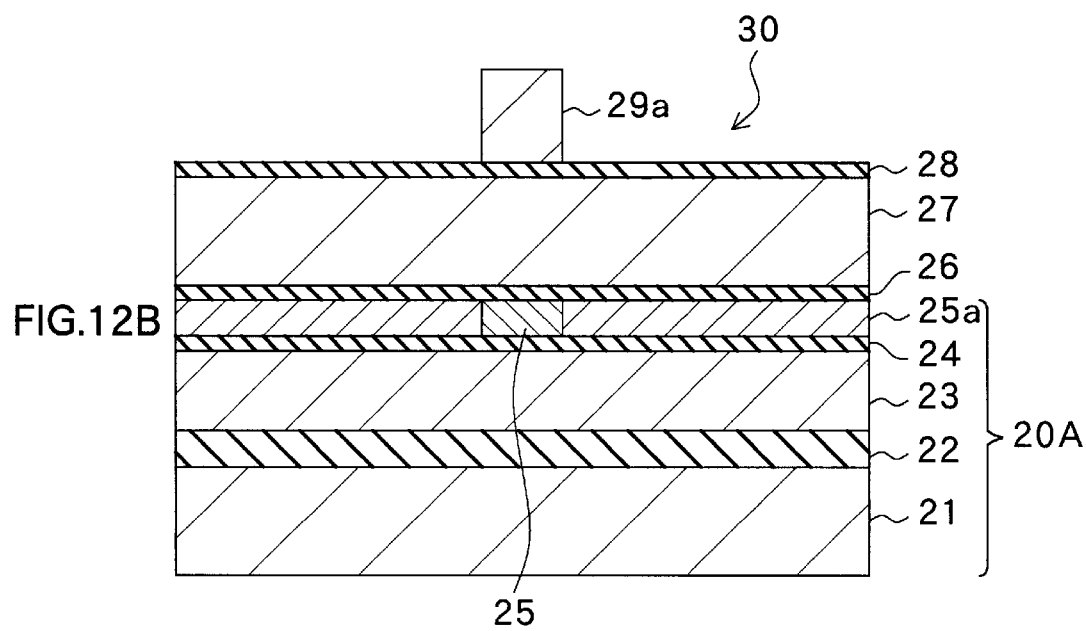

Referring to FIG. 12A and FIG. 12B, a magnetic head device having another configuration and a method of manufacturing the same will now be described. Like numerals are assigned to components similar to those of the magnetic head device 20.

In the magnetic head device 30, as shown in FIG. 12B, the top writing pole 29a is only formed into a projection and the sidewall is substantially orthogonal to the surface of the gap layer 28 and the cross section is rectangular. The top shield layer 27 functions as the bottom writing pole layer opposed to the top writing pole layer 29a as well. The remainder of the configuration is similar to that of the magnetic head device 20.

In the magnetic head device 30, too, the sidewall of the top pole 29a is orthogonal to the base layer (the gap layer 28). Consequently, no flux leakage results and writing is steadily performed.

The magnetic head device 30 may be formed through the following steps. The steps illustrated in FIG. 9A to FIG. 9C are similar to those of the foregoing method and descriptions thereof are omitted. After the top writing pole layer 29 is formed in the step shown in FIG. 9C, the etching mask 11 is formed on the top writing pole layer 29 as shown in FIG. 12A. Next, ion beam etching is performed through the use of the mask 11 to selectively remove the top writing pole layer 29 only as indicated with the broken line. The top writing pole 29a is thus formed. The mask 11 is then removed. The magnetic head device 30 comprising the top writing pole 29a having a width equal to width $W_1$ of the mask 11 is thereby obtained as shown in FIG. 12B.

Figure 13A:
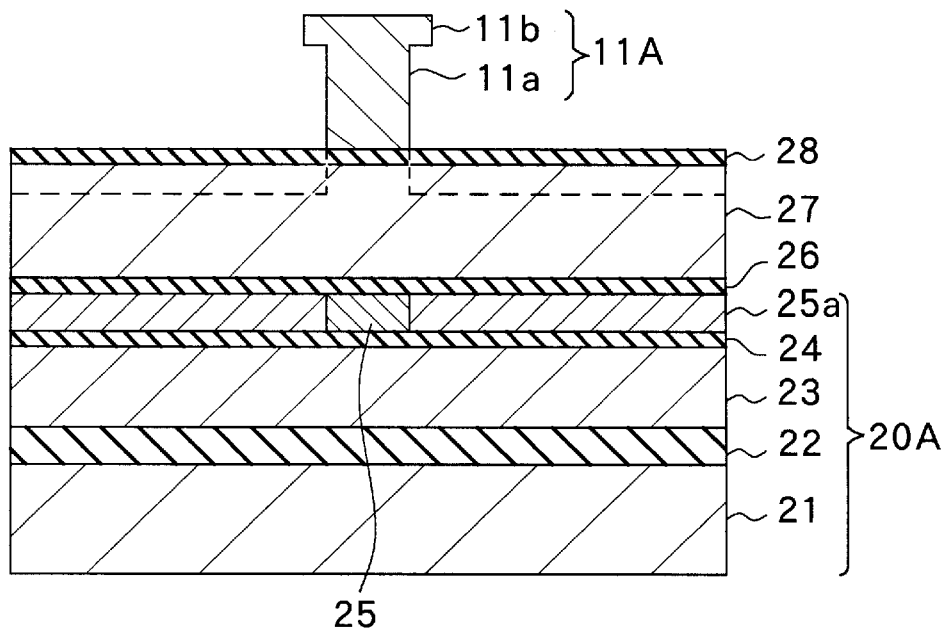
FIG. 13A and FIG. 13B are cross sections of manufacturing steps for illustrating a method of manufacturing still another magnetic head device using the etching mask shown in FIG. 1A to FIG. 1D.
Figure 13B:
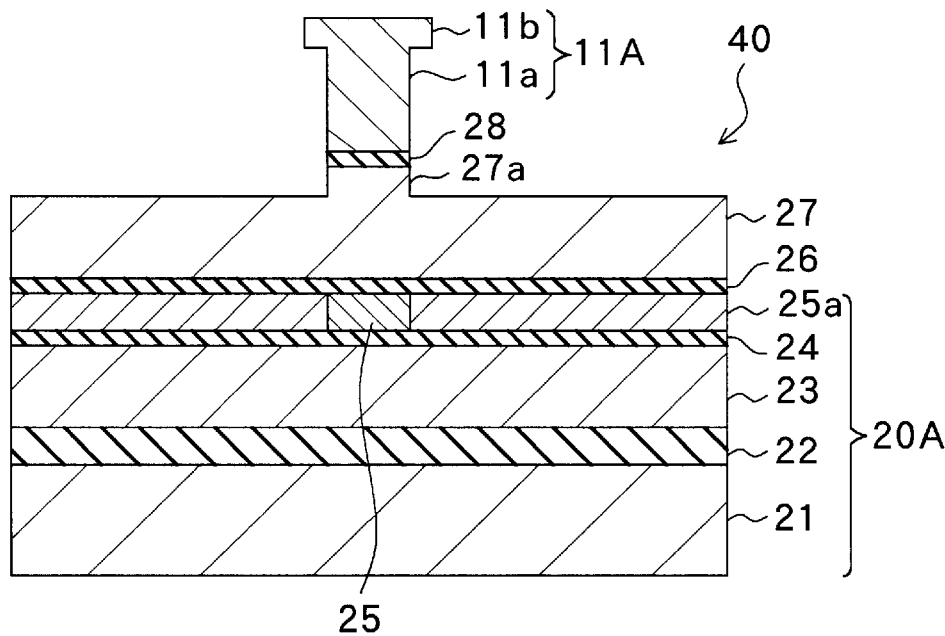
Figure 14A:
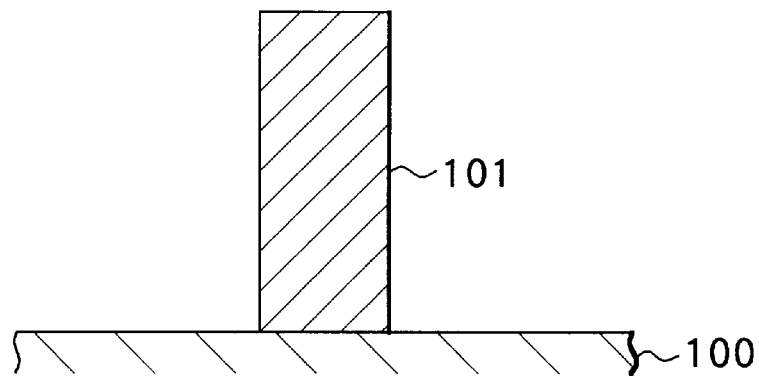
FIG. 14A to FIG. 14C are cross sections of manufacturing steps for illustrating an etching method using a related-art etching mask.
Figure 14B:
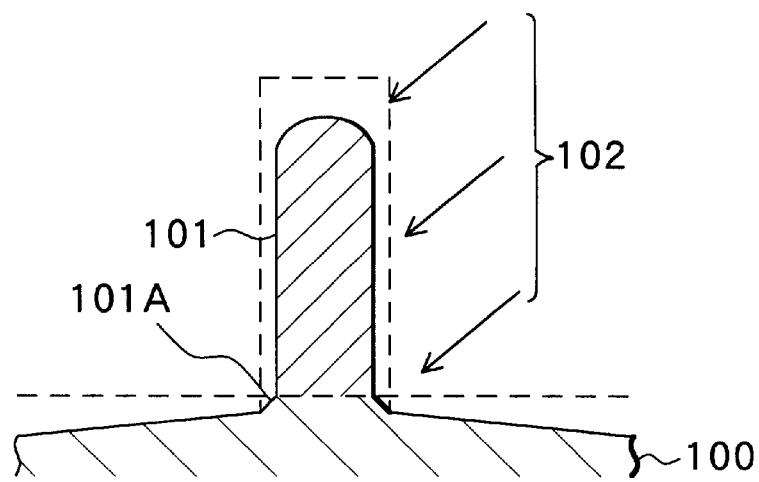
Figure 14C:
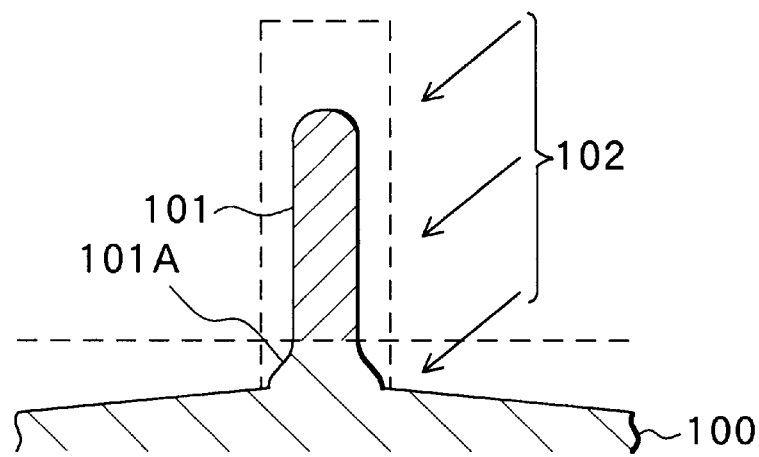

FIG. 13A and FIG. 13B illustrate still another magnetic head device 40 and a method of manufacturing the same. Like numerals are assigned to components similar to those of the magnetic head device 20.

In the magnetic head device 40 an etching mask 11A itself made of a magnetic material is utilized as the top writing pole. The manufacturing process is thereby simplified.

The magnetic head device 40 may be formed through the following steps. As shown in FIG. 13A, the reading head 20A is formed on the substrate 21 as in the steps shown in FIG. 9A and FIG. 9B. The gap layer 26, the top shield layer 27 functioning as the bottom writing pole as well, and the gap layer 28 are further formed on the reading head 20A. Next, the etching mask 11A made of a magnetic material such as Permalloy (NiFe) is formed on the gap layer 28. The gap layer 28 and the surface of the top shield layer 27 are selectively removed, as shown with the broken line, by dry etching such as ion beam etching through the use of the mask 11A. Consequently, as shown in FIG. 13B, the bottom writing pole layer 27a whose width is equal to width $W_1$ of the mask 11A is formed. In the magnetic head device 40 the mask 11A is left and utilized as the top writing pole opposed to the bottom writing pole layer 27a. In this example, however, if the lateral bar 11b of the mask 11A is greater than the vertical bar 11a in width, flux may leak. It is therefore preferred that the width of the lateral bar 11b is as small as possible, that is, about 0.5 μm, for example. Alternatively, part of the vertical bar 11a in contact with the gap layer 28 may be made of a high magnetic density (Hi-Bs) material.

EXPERIMENTAL EXAMPLE

An etching mask was formed through the first method shown in FIG. 3A to FIG. 3E. A resist pattern having an opening of 5.0 μm in thickness and 1.0 μm in width was formed on a semiconductor wafer on which an electrode layer was formed, the electrode layer including three layers of a NiFe (18 weight % of Ni) film (0.5 μm in thickness), a $SiO_2$ film (0.25 μm in thickness), and a NiFe (18 weight % of Ni) film (0.5 μm in thickness). Plating was then performed. As pretreatment, the wafer was immersed in a 4.5% hydrochloric acid (HCl) solution for about 2 minutes. Next, the wafer was immersed in a dilute plating solution of pure water (NiB electroless plating solution) of pH 6.0 whose temperature was maintained at 50° C. for 25 minutes. A plating film of 2.0 μm in thickness was thus formed. The formula of the plating film was 99% of Ni and 1% of B. Ion beam etching was then performed, using the etching mask made of the plating film, until the three layers of the electrode layer were selectively removed. The resist film was then removed with acetone. The conditions for ion beam etching were: the pressure of $2.2 \times 10^{-2}$ Pa, power of 1000 V and 400 A, etching angle θ (See FIG. 2C) of −20 degrees. The etching duration was 20 minutes. Under the same conditions, etching was performed with a related-art rectangular etching mask.

The patterns obtained were each observed by a laser microscope. The pattern obtained with the related-art etching mask had a curved portion in the upper part. In contrast, the pattern obtained with the T-shaped etching mask was rectangular.

The invention is not limited to the foregoing embodiments and example but may be practiced in still other ways. For example, although the foregoing embodiment describes the examples of manufacturing the magnetic head device comprising the magnetoresistive reading head and the inductive writing head through the use of the etching mask of the invention, the invention is applicable to manufacturing of any other type of magnetic head device or any other device other than a magnetic head device.

Although in the foregoing embodiment a photoresist is used as the film for forming the mask, an electron-sensitive resin film that reacts to electron beams may be used.

Although the etching mask of the embodiments is completely T-shaped in cross section, the mask may have other shapes such as a shape in which part of the vertical bar projects from the lateral bar (that is, a cross) or a modified T. In other words, the etching mask has a cross section including a first region that substantially determines the pattern width of the workpiece and a second region that obstructs ion beams heading for the sidewall of the first region while etching is performed.

The method of making the etching mask is not limited to the foregoing first to fourth methods but may be any other method.

According to the etching mask of the invention, the mask is made of a metal and has the cross-sectional shape including the rectangular first region that determines a pattern width of the workpiece and the second region that intercepts the application of etching beams to a sidewall of the first region while etching is performed. As a result, a pattern rectangular in cross section is precisely formed on the workpiece by dry etching.

According to the method of making an etching mask of the invention, an etching mask that is T-shaped in cross section is easily formed. Furthermore, the manufacturing process is simplified and the mask size is precisely controlled.

According to the etching method of the invention, dry etching is performed with the etching mask that is T-shaped in cross section. As a result, precise micromachining is performed.

According to the magnetic head device of the invention, the first writing pole has a rectangular cross section whose sidewall is substantially orthogonal to the base surface. As a result, flux leakage in the writing pole is suppressed and steady writing is achieved.

According to the method of manufacturing a magnetic head device of the invention, micromachining is performed with the etching mask that is T-shaped in cross section. As a result, the magnetic head comprising the first writing pole having a rectangular cross section whose sidewall is substantially orthogonal to the base surface is easily formed.

Obviously many modifications and variations of the present invention are possible in the light of the above teachings. It is therefore to be understood that within the scope of the appended claims the invention may be practiced otherwise than as specifically described.

What is claimed is:

1. A method of making an etching mask made of a metal and having a T-shaped cross section including a vertical bar and a lateral bar, including the steps of:

forming a film for mask formation on a workpiece and forming an opening in the film for mask formation, the opening reaching the workpiece and having a specific width; and forming a metal film in the opening and over a region around the opening to form the etching mask and removing the film for mask formation, the mask having a T-shaped cross section including a vertical bar and a lateral bar.

2. A method according to claim 1 wherein the thickness of the film for mask formation is made equal to the height of the vertical bar of the mask and the width of the opening is made equal to the width of the vertical bar.

3. A method of making an etching mask made of a metal and having a T-shaped cross section including a vertical bar and a lateral bar, including the steps of:

forming a film for mask formation having a specific thickness on a workpiece and performing a first exposure on a region of a specific width in the film by such an exposure amount that reaches the workpiece;

after the first exposure, forming a T-shaped exposed region by performing a second exposure on a region in the film having a width greater than that of the region exposed through the first exposure by an exposure amount smaller than that of the first exposure;

selectively removing the exposed regions of the film for mask formation to form a T-shaped opening; and forming a metal film in the opening of the film for mask formation to form the etching mask and removing the film for mask formation, the mask having a T-shaped cross section including a vertical bar and a lateral bar.

4. A method according to claim 3 wherein the thickness of the film for mask formation is made equal to the height of the mask, the width of the opening of the film for mask formation formed by the first exposure is made equal to the width of the vertical bar, and the width of the opening formed by the second exposure is made equal to the width of the lateral bar.

5. A method of making an etching mask made of a metal and having a T-shaped cross section including a vertical bar and a lateral bar, including the steps of forming a first film for mask formation on a workpiece and forming a first opening having a specific width that reaches the workpiece in the first film;

forming a metal film in the first opening and removing the first film;

forming a second film for mask formation on the metal film and the workpiece and then forming a second opening in the second film, the second opening reaching the metal film and having a width greater than that of the metal film; and forming a metal film in the second opening to form the etching mask that is T-shaped in cross section and includes a vertical bar and a lateral bar, and then removing the second film.

6. A method of making an etching mask made of a metal and having a T-shaped cross section including a vertical bar and a lateral bar, including the steps of forming a first film for mask formation on a workpiece and forming a first opening having a specific width that reaches the workpiece in the first film;

forming a metal film in the first opening, forming a second film for mask formation on the metal film and the first film, and then forming a second opening in the second film, the second opening reaching the metal film and having a width greater than that of the metal film; and forming a metal film in the second opening to form the etching mask that is T-shaped in cross section and includes a vertical bar and a lateral bar, and then removing the first and second films.

7. A method according to claim 5 wherein the thickness of the first film is made equal to the height of the vertical bar of the mask, the width of the first opening is made equal to the width of the vertical bar, and the width of the second opening is made equal to the width of the lateral bar.

8. A method according to claim 1 wherein the metal film is formed by plating.

9. A method according to claim 8 wherein the plating is electroless plating.

10. An etching method including the steps of: forming an etching mask made of a metal and having a T-shaped cross section on a workpiece, and then performing micromachining of the workpiece by dry etching through the use of the etching mask.

11. An etching method according to claim 10 wherein the dry etching is performed through ion beam etching.

12. A method of manufacturing a magnetic head device comprising an inductive writing head including a first writing pole, a second writing pole corresponding to the first writing pole, and a gap layer placed between the first and second writing poles, including the steps of:

stacking a layer to be the first writing pole, the gap layer, and a layer to be the second writing pole in this order and then forming an etching mask made of a metal and having a T-shaped cross section on the layer to be the second writing pole; and selectively removing the layer to be the second writing pole by dry etching using the etching mask to form a rectangular cross section.

13. A method of manufacturing a magnetic head device comprising an inductive writing head including a first writing pole, a second writing pole corresponding to the first writing pole, and a gap layer placed between the first and second writing poles, including the steps of:

stacking a layer to be the first writing pole, the gap layer, and a layer to be the second writing pole in this order and then forming an etching mask made of a metal and having a T-shaped cross section on the layer to be the second writing pole; and selectively removing the layer to be the second writing pole, the gap layer, and a region to the middle in depth of the layer to be the first writing pole in this order by dry etching using the etching mask to form a rectangular cross section.

14. A method of manufacturing a magnetic head device comprising an inductive writing head including a first writing pole, a second writing pole corresponding to the first writing pole, and a gap layer placed between the first and second writing poles, including the steps of:

stacking a layer to be the first writing pole and the gap layer, and then forming an etching mask made of a magnetic material and having a T-shaped cross section to be the second writing pole on the gap layer; and selectively removing the gap layer and a region to the middle in depth of the layer to be the first writing pole in this order by dry etching using the etching mask to form a rectangular cross section.

15. A method of manufacturing a magnetic head device comprising an inductive writing head including a first writing pole, a second writing pole corresponding to the first writing pole, and a gap layer between the first writing pole and the second writing pole, the method comprising the steps of:

stacking a layer to be the first writing pole, the gap layer and a layer to be the second writing pole in this order and then forming an etching mask by the method of claim 5 on the layer to be the second writing pole; and selectively removing the layer to be the second writing pole by dry etching using the etching mask to form a rectangular cross section.

16. A method of manufacturing a magnetic head device comprising an inductive writing head including a first writing pole, a second writing pole corresponding to the first writing pole, and a gap layer between the first writing pole and the second writing pole, the method comprising the steps of:

stacking a layer to be the first writing pole, the gap layer and a layer to be the second writing pole in this order and then forming an etching mask by the method of claim 7 on the layer to be the second writing pole; and selectively removing the layer to be the second writing pole by dry etching using the etching mask to form a rectangular cross section.

17. A method of manufacturing a magnetic head device comprising an inductive writing head including a first writing pole, a second writing pole corresponding to the first writing pole, and a gap layer between the first writing pole and the second writing pole, the method comprising the steps of step of:

selectively removing the layer to be the second writing pole by dry etching using the etching mask to form a rectangular cross section.

18. A method of manufacturing a magnetic head device comprising an inductive writing head including a first writing pole, a second writing pole corresponding to the first writing pole, and a gap layer between the first writing pole and the second writing pole, the method comprising the steps of:

stacking a layer to be the first writing pole, the gap layer and a layer to be the second writing pole in this order and then forming an etching mask by the method of claim 10 on the layer to be the second writing pole; and selectively removing the layer to be the second writing pole by dry etching using the etching mask to form a rectangular cross section.

* * * * *